Sept. 29, 1942.   L. A. LADNER ET AL   2,297,189
STAKING MACHINE
Filed Aug. 2, 1940   8 Sheets-Sheet 1
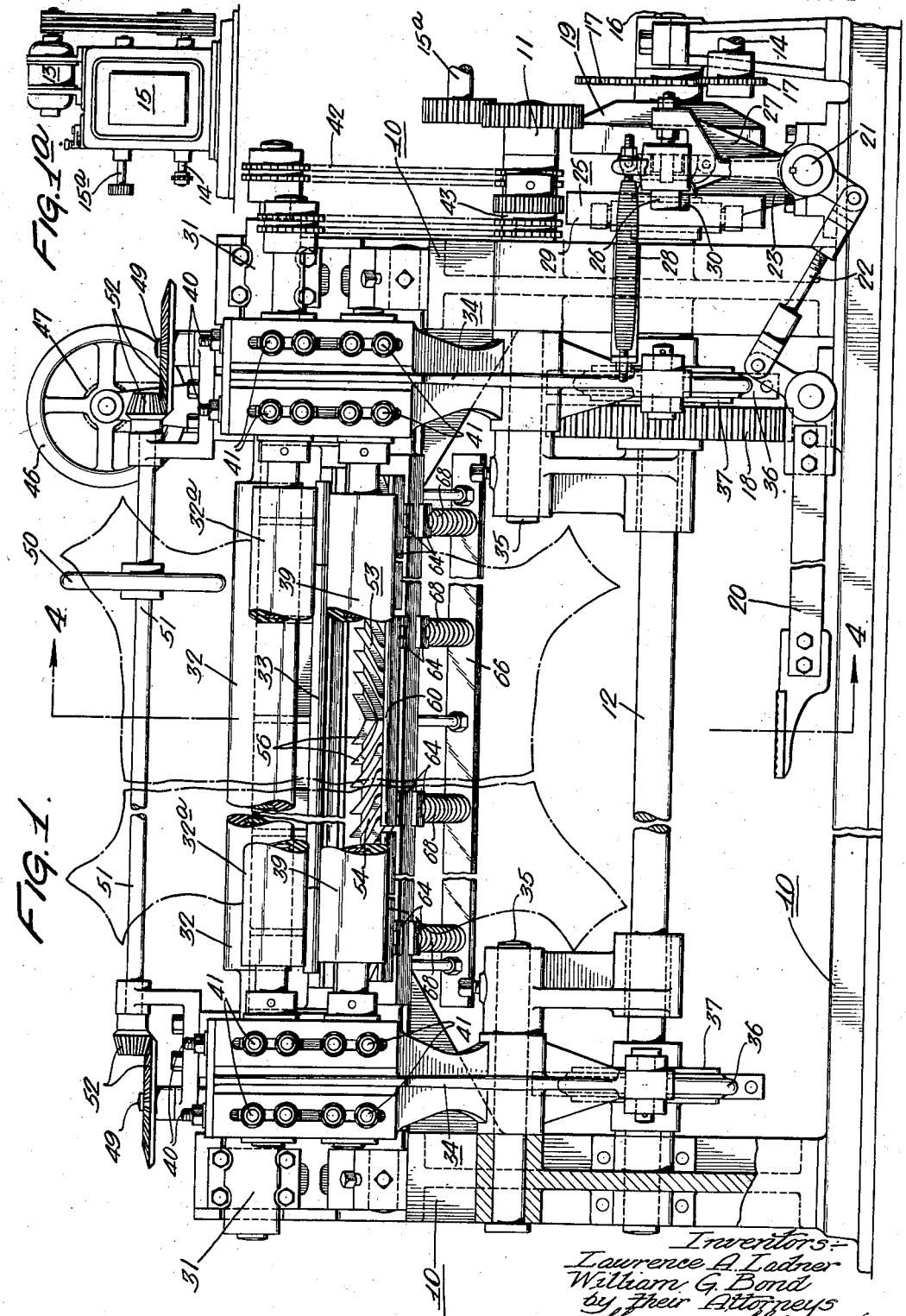

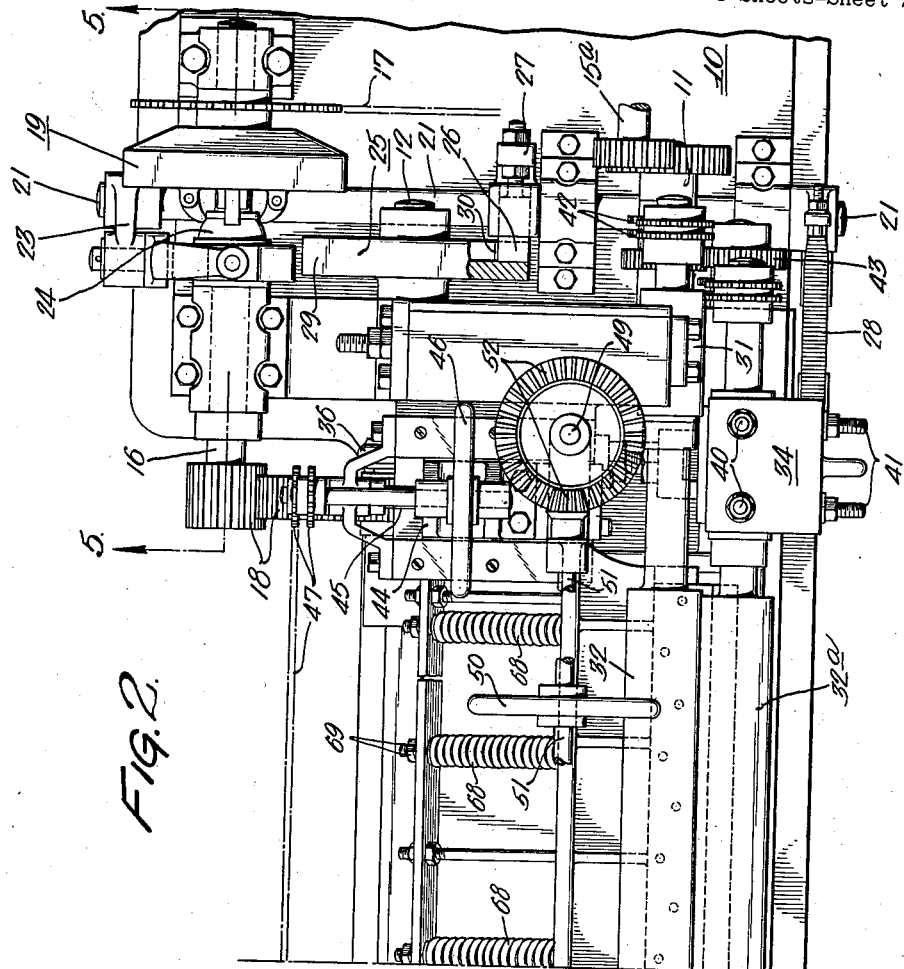

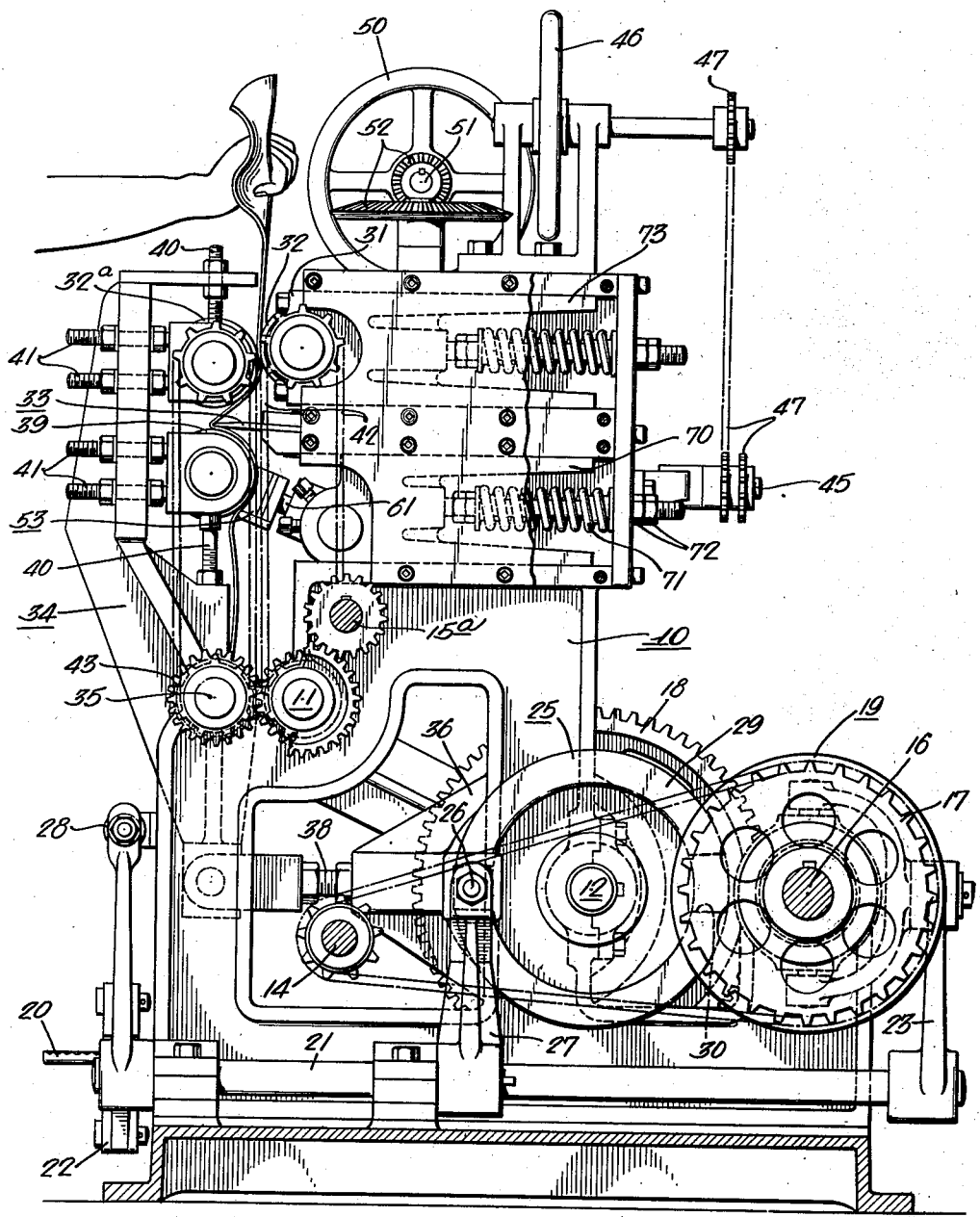

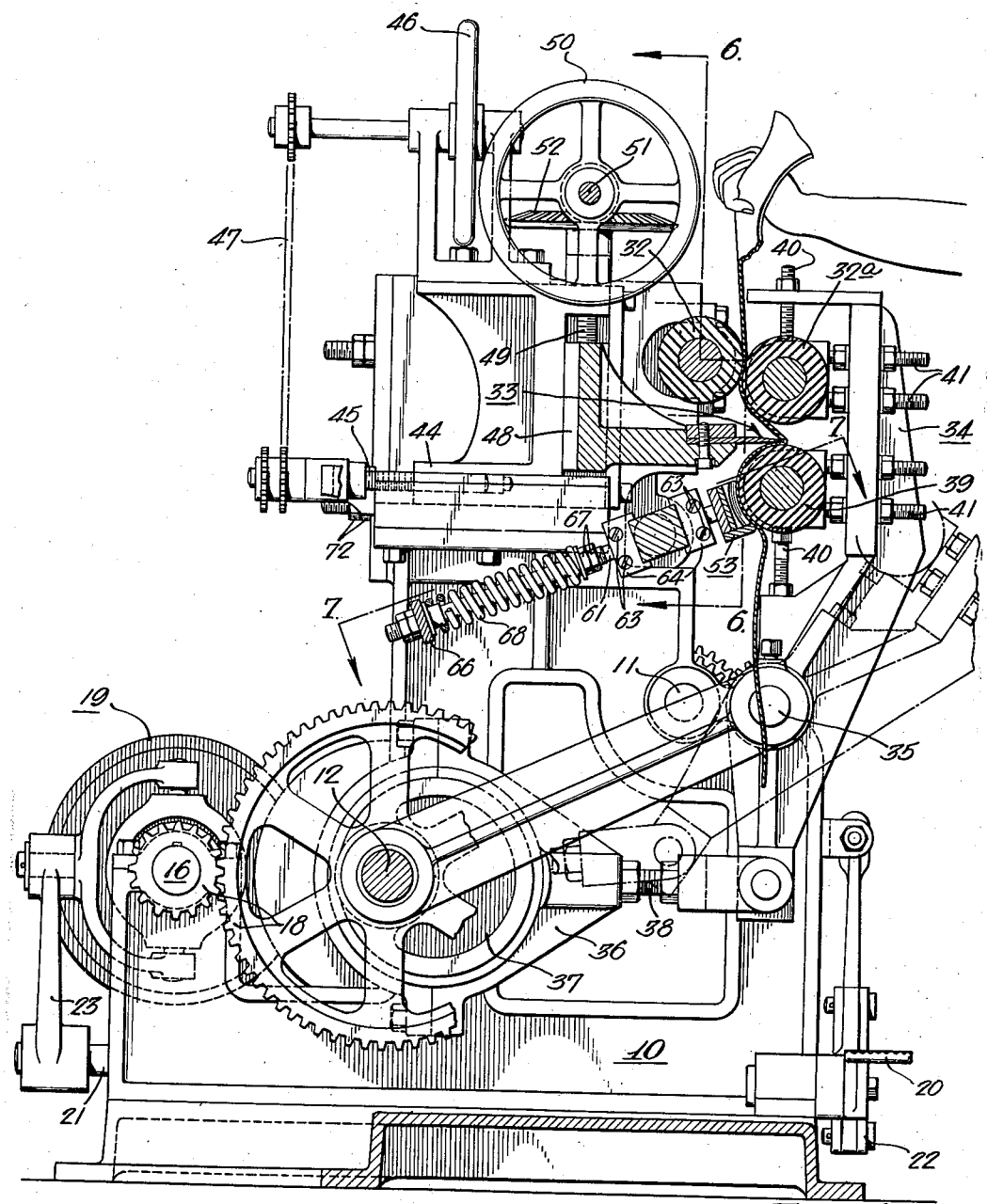

Sept. 29, 1942.  L. A. LADNER ET AL  2,297,189
STAKING MACHINE
Filed Aug. 2, 1940  8 Sheets-Sheet 5

Sept. 29, 1942.   L. A. LADNER ET AL   2,297,189
STAKING MACHINE
Filed Aug. 2, 1940   8 Sheets-Sheet 6
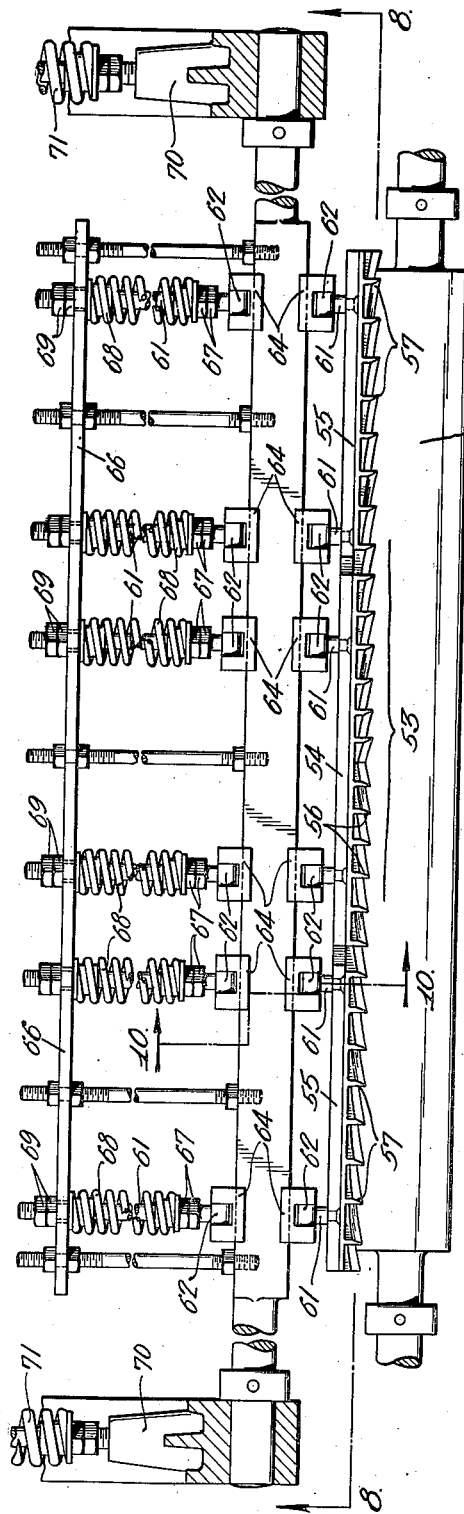
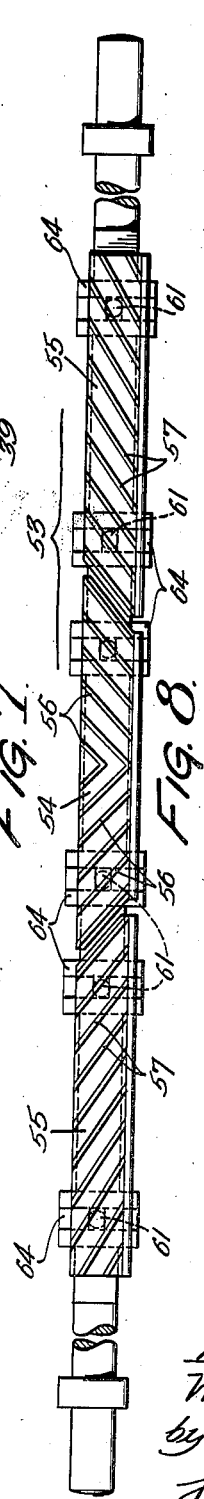
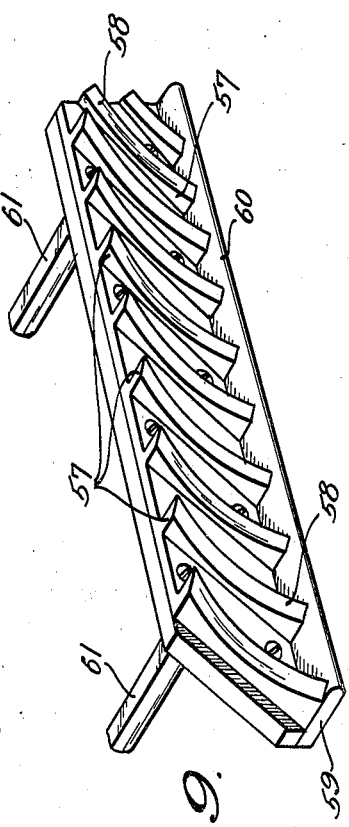
Inventors:-
Laurence A. Ladner
William G. Bond
by their Attorneys
Howson & Howson Sept. 29, 1942.   L. A. LADNER ET AL   2,297,189
STAKING MACHINE
Filed Aug. 2, 1940   8 Sheets-Sheet 7
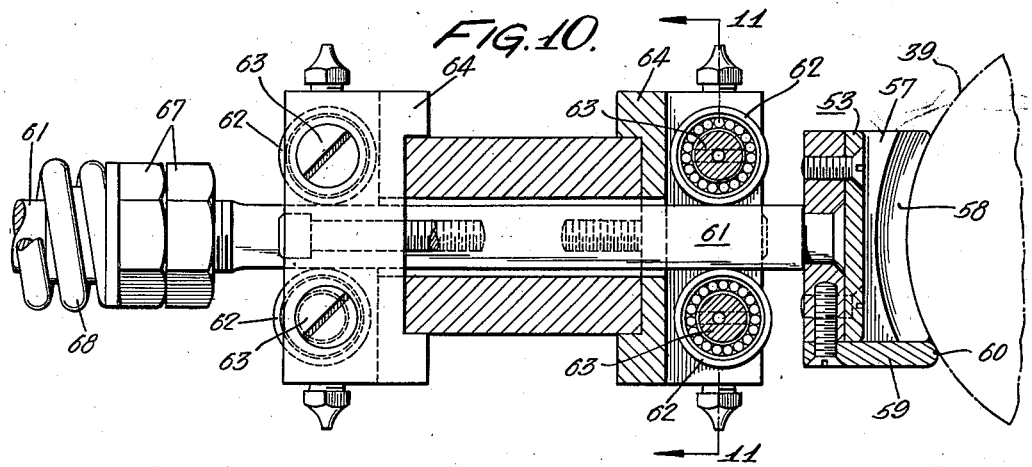
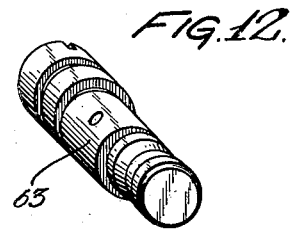
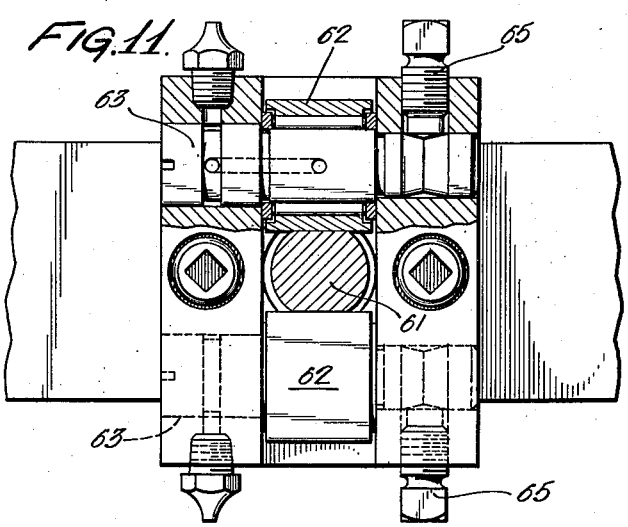
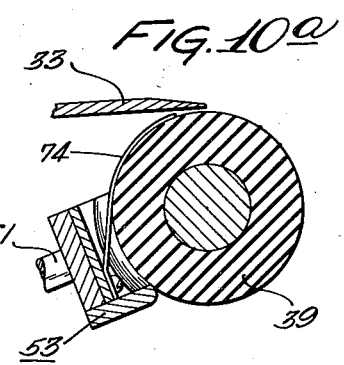
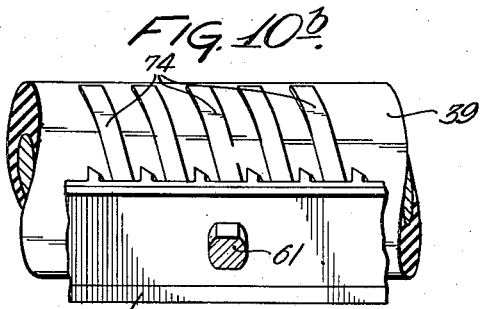
Inventors:
Lawrence A. Ladner
William G. Bond
by their Attorneys
Howson & Howson

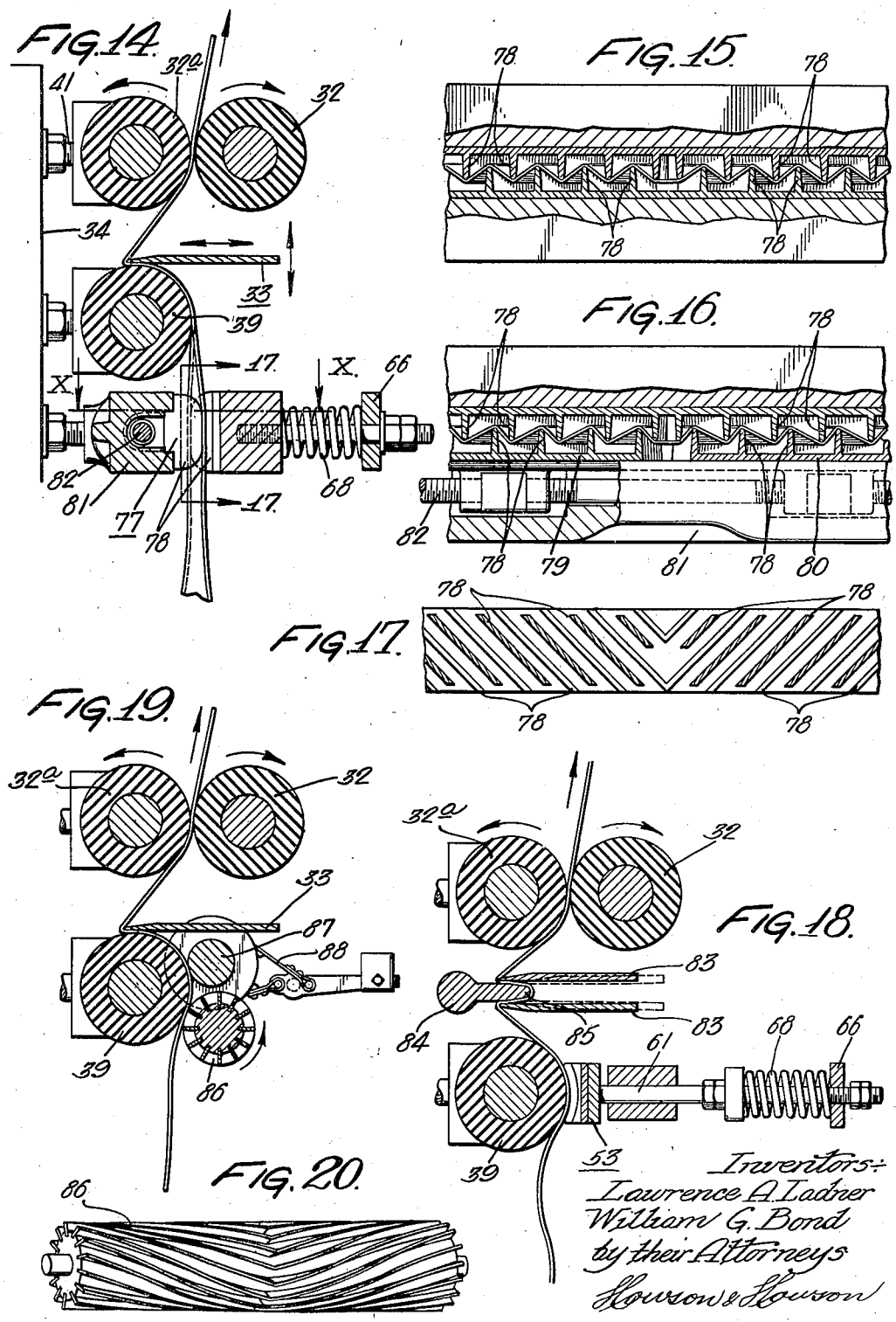

Patented Sept. 29, 1942

2,297,189

UNITED STATES PATENT OFFICE 2,297,189

STAKING MACHINE

Lawrence Anthony Ladner, Camden, N. J., and William G. Bond, Holly Oak, Del., assignors to S. Sturgis Stout, Cynwyd, Pa.

Application August 2, 1940, Serial No. 349,734

10 Claims. (Cl. 149—20)

This invention relates to leather staking machines, and has for a particular object thereof a material improvement in the stretching mechanism ordinarily employed in such machines.

Another object of the invention is to provide means whereby the engagement of the stake with the hide may be very closely and accurately regulated.

A further and more specific object of the invention is to provide a staking mechanism which will provide for substantially uniform stretching of a hide regardless of the fact that the hide contains portions of varying thicknesses.

Another object of the invention is to provide means whereby the pressure exerted by the stretching mechanism may be very closely regulated.

A still further object of the invention is to provide means whereby the stretching mechanism may, of itself, be made a portion of the staking mechanism.

Another and important object of the invention is the provision of means whereby the tension exerted on the skin during the staking operation may be adjusted and, if so desired, this adjustment may be accomplished during operation of the machine.

These and other objects we attain by the construction shown in the accompanying drawings, wherein:

Fig. 1 is a front elevation, partially broken away, of a staking machine constructed in accordance with our invention;

Fig. 1a is an elevation of the drive employed in the machine of Fig. 1;

Fig. 2 is a plan view of our staking machine;

Fig. 3 is an end elevation thereof;

Fig. 4 is a vertical sectional view therethrough on line 4—4 of Fig. 1;

Fig. 5 is a section on line 5—5 of Fig. 2;

Fig. 7 is a section on line 7—7 of Fig. 4;

Fig. 8 is a detail elevation of the stretching bar;

Fig. 9 is a fragmentary perspective of a portion of the stretching bar;

Fig. 10 is a section on line 10—10 of Fig. 7;

Fig. 10a is a fragmentary sectional view similar to that of Fig. 10 illustrating the use of retaining fingers to prevent wrinkling of the hide after passage through the stretching mechanism;

Fig. 10b is a fragmentary front elevation of a portion of the stretching bar equipped with the retaining fingers;

Fig. 11 is a section on line 11—11 of Fig. 10;

Fig. 12 is a perspective view showing the adjustable mounting for the rollers guiding the stretching mechanism;

Fig. 14 shows a further modification of the stretching mechanism;

Figs. 15 and 16 are fragmentary sectional views taken on line X—X of Fig. 14;

Fig. 17 is a section on line 17—17 of Fig. 14;

Fig. 18 is a detail sectional view showing a modification of the staking blade arrangement;

Fig. 19 is a fragmentary sectional view showing a modification of the invention;

Fig. 20 is a perspective view of the stretching roller shown in Fig. 19; and

Figure 6:
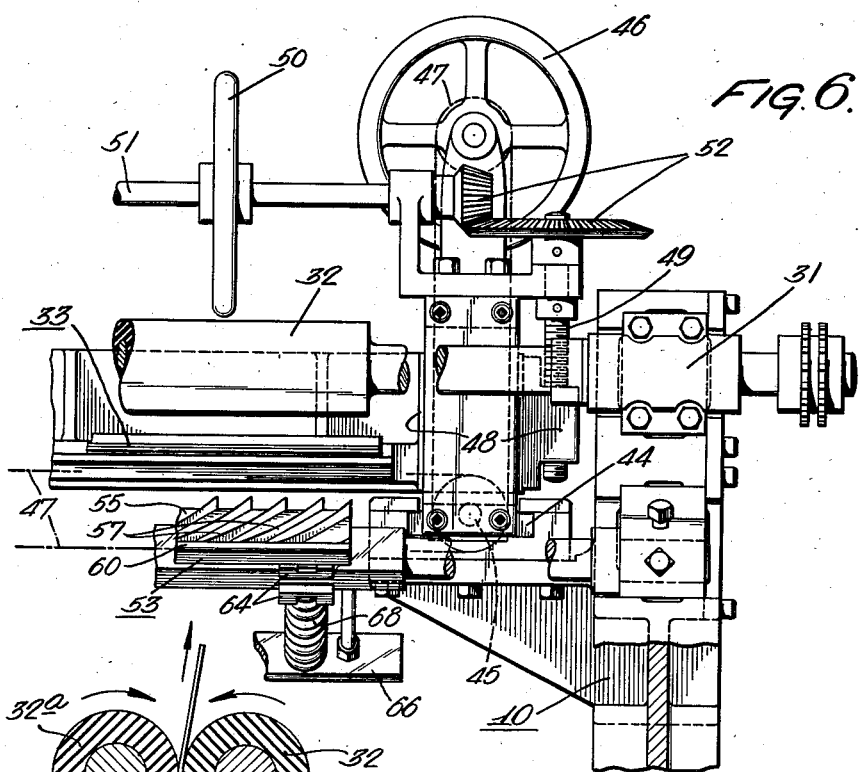
Fig. 6 is a section on line 6—6 of Fig. 4.

Referring now more particularly to the drawings, the numeral 10 generally designates the main frame of the machine, which frame mounts a pair of parallel shafts 11 and 12 driven from a motor 13. In the present illustration, the motor 13 is shown as directly driving shaft 14 of a continuously variable transmission 15 preferably of the type known as the Reeves drive. This shaft 14, in turn, drives the shaft 16 through a chain and sprocket drive, as illustrated generally at 17, and shaft 16 through gearing 18 drives shaft 12. The chain and sprocket drive 17 includes a clutch 19 operable through a treadle 20 through an oscillating shaft 21 to which the pedal 20 is linked, as at 22, shaft 21 having an arm 23 by which the movable member 24 of the clutch may be shifted. Means are provided for holding the shaft 12 in adjusted positions, this means comprising a 180° clutch mechanism 25 the movable dogging element 26 of which is, likewise, operated by an arm 27 secured upon shaft 21. A spring 28 normally tends to maintain the movable element of clutch 19 in its disengaged position and to maintain the dogging element 26 of the 180° clutch 25 in its engaged position so that upon momentary operation of the pedal 20 the dogging mechanism will be released and clutch 19 engaged to drive shaft 16. The face of the clutch plate 29 will maintain the dogging mechanism in a position such that clutch 19 will remain engaged until this dogging mechanism engages in the next of the openings 30 of the 180° clutch plate 29, at which time the operation of both shafts 16 and 12 will be interrupted.

Mounted in fixed bearings 31 upon the frame 10 is a rubber-clad roller 32 constituting one of a pair of draw rollers adapted to feed the hide about the staking mechanism generally designated at 33. The other of these draw rollers 32a is carried by a swinging frame section 34 which is pivotally movable about a pivot 35 carried by the main frame which engages the swinging frame section intermediate the ends thereof. The lower end of this frame section is connected to the eccentric straps 36 which embrace eccentric 37 secured to shaft 12, the connections between eccentric straps proper and the lower end portions of the frame 34 including an adjusting mechanism designated at 38.

It will be obvious that upon one actuation of treadle 20 the swinging frame section 34 will be moved away from roll 32 to the dotted position shown in Figure 4, while upon the next actuation thereof this frame will be swung back so that the roll 32a will be brought into clamping engagement upon an intervening hide with the roll 32 and, as will hereinafter become obvious, cause the hide to be fed about the staking mechanism. In addition to the roll 32a, the swinging frame section likewise mounts a backing roller 39 for the stretching mechanism. Both rolls 32a and 39 are preferably rubber covered, as illustrated, and are mounted in bearings adjustable through vertical and horizontal adjustable screws 40 and 41 to regulate the position thereof. Roll 32 is driven from the shaft 11 through a chain and sprocket drive generally designated at 42. This shaft 11 is geared directly to a sleeve 43 rotatably mounted on one of the pivots 35 of swinging frame 34, which sleeve is sprocket connected to the roller 32a, and is driven by the output shaft 15a of transmission 15.

The staking mechanism comprises a blade structure supported for horizontal adjustment fore and aft of the machine by means of slides 44 carried by the main frame 10, these slides being adjustable through screws 45 which are, in turn, controlled by a hand wheel 46 which is chain-and-sprocket connected to the screws as at 47. This blade mechanism is further vertically adjustable through slides 48 mounted upon slides 44 and operated by screws 49 controlled by a hand wheel 50 connected to these screws through shaft 51 and gearings 52. The staking blade employed is preferably flexible and it will be noted that by vertical adjustment of this blade the friction exerted against the hide passing thereabout may be regulated, the blade exerting a greater or lesser pressure on the hide against backing-up roll 39, as desired. The machine is thus adaptable for staking either tough or fragile hides.

The backing-up roll 39 of the swinging frame, when said frame is in its operative position illustrated in full lines in Figure 4, is opposed by a spring-pressed stretcher bar generally designated at 53. This bar is composed of a plurality of sections comprising, as shown, a central section 54 and end sections 55, although the number of sections employed may be increased, as desired. The central section 54 comprises oppositely inclined blades 56, and the end sections 55 comprise inclined blades 57 the inclination of which is similar to the inclination of the blades on the adjacent end of the central section. The inclination of the blades 56, 57 increases from the center of the stretching bar 53 to the ends thereof, each blade being slightly more inclined than its predecessor. Each blade is, furthermore, beveled as at 58 on that face thereof which is adjacent to the center of the bar and is arcuately curved at its roll-opposing face with a curvature closely approximating that of the roll surface and, accordingly, the curvature of a hide stretched across the surface of roll 39, as more clearly shown in Figure 10. The lower surface of the bar is provided with a safety ledge 59 having a rounded nose 60 opposing the roll 39 and disposed in the same curvilinear plane as the front faces of blades 56, 57, which nose serves to prevent gouging of the lower ends of the hide by the lower ends of the ribs.

The several sections of the spreader bar are mounted for movement fore and aft of the machine, being provided with guide rods 61 mounted in roller bearings 62. These bearings 62 are adjustable through the use of eccentric pivots 63 rotatably mounted in bearing blocks 64 and held against rotation in their adjusted positions by set screws 65. The rear ends of guide rods 61 are extended through a plate 66 and between this plate and stop nuts 67 carried by the rods, springs 68 are disposed and are adapted to constantly, yieldably urge the sections of the spreader bar toward the backing-up roller 39 until such movement is limited by adjustable stop nuts 69 on the outer ends of the guide bars. The guide bearings for guide bars 61 are carried by a bar extending longitudinally of the machine and secured at its ends to cross heads 70 slidably mounted upon the machine frame 10 and provided with springs 71 for urging them toward the backing-up mechanism. Adjusting nuts 72 serve to limit the movement of these cross heads under influence of their springs. The roller 32 is preferably mounted in similar cross heads 73.

It will be obvious that by use of the sectional pressure bar hides of uneven thickness may be readily handled and evenly spread. In some cases it becomes desirable to employ with the spreader bar flexible fingers 74 which may be conveniently attached to the spreader bar between the blades 57 thereof, as more clearly shown in Figure 10a, these fingers conforming to the shaping of the backing-up roll and serving to prevent wrinkling of the hide after its passage between the spreader bar and roll and until the hide reaches the staking mechanism 33. It will also be obvious that in lieu of the sectional bar illustrated, the same effect may be obtained by independently resiliently mounting the individual blades upon a rigid supporting bar or by mounting these blades rigidly upon a highly flexible bar which is, in turn, spring-pressed at intervals along its length.

Figure 13:
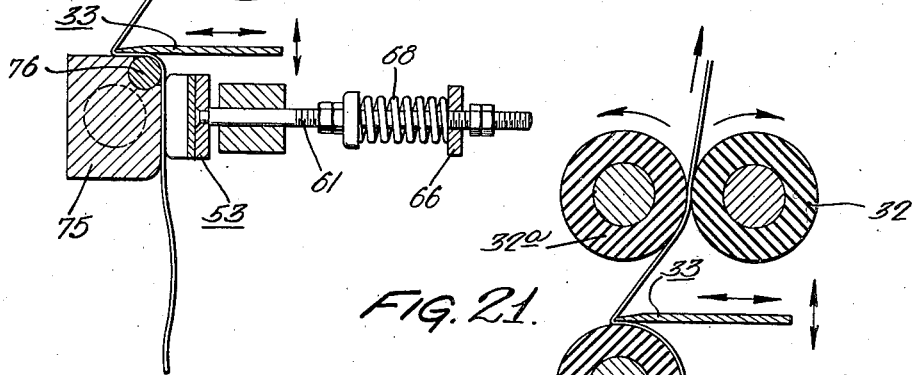
Fig. 13 shows a slightly modified arrangement of the stretching mechanism.

In lieu of the backing-up roller, such as shown at 39, a rigid bar 75 may be employed, in which case the confronting faces of the backing-up bar and spreader bar are shaped to conform to one another, as more clearly shown in Figure 13. The upper corner of the backing-up bar about which the hide will be flexed in operation is preferably provided with an inset rotatable shaft 76 in order to avoid possible binding of the hide. It is, likewise, possible to employ a backing-up means for the spreader bar which will itself act as a spreader and which will itself coact with the spreader bar to perform a staking action. Such a construction is illustrated in Figures 14 to 17 inclusive. In these figures the backing-up bar 77 has blades 78 which inter-digitate with those of the sections of the spreader bar when the swinging frame section is in its operative position, with the result that the head is flexed between these blades and the blades serve to perform both spreading and staking operations. In such a construction it is desirable that the blades be shiftable to vary the relative spacing in the engaged position. To this end, the bar 77 is formed in two sections 79 and 80 which are slidably mounted upon a support 81 and are adjustable toward and away from one another through a compound screw 82 carried by the support 81.

While in the figures so far discussed the staking blade has been shown as a single blade, this portion of the structure is, obviously, capable of considerable modification; for example, as shown in Figure 18 there may be a plurality of staking blades 83 carried by the main frame and the swinging frame may have mounted thereon a structure 84 including a nose 85 adapted in the operative position of the swinging frame to engage between the blades and flex the hide therebout. In order to avoid too great a flexing of the grain side of the hide, the nose 85 is relatively wide and smoothly rounded, and may, if so desired, comprise an anti-friction roller. The side faces of the nose are preferably tapered, as shown, and the flexible blades 83 upon adjustment toward and away from the rear portion of the structure 84 exert a greater or lesser tension upon the hide, this adjustment being illustrated in dotted lines in Figure 18.

Figure 21:
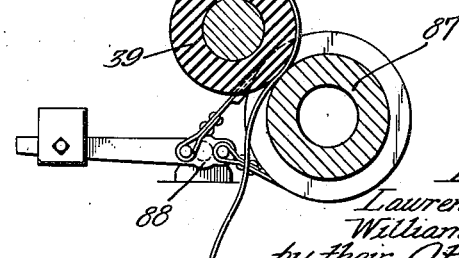
Fig. 21 is a further modification illustrating a construction usable with pasted hides.

It is, of course, possible to use in such a machine, in lieu of a bar of the type described, the usual rotating spreader bar 86 which will, as in the prior application of Larner Doughty and L. A. Ladner, Serial No. 242,096, filed November 23, 1938, for "Improvements in staking machines," be positively driven. In this event, I provide a pressure roller 87 engaging the backing-up roller through the hide and this pressure roller is equipped with an adjustable friction brake 88 so that the tension on the hide at the staking blade may be very closely regulated. A pressure roller of this type may be, likewise, employed with the mechanisms previously described. Where pasted hides are to be treated, the spreading mechanism may be eliminated and tension upon the hide may be maintained by a similar brake-equipped pressure roller, as shown in Figure 21.

In operation of the machine, the operator applies temporary pressure to the pedal 20, swinging the frame through operation of the 180° clutch to the dotted line position of Figure 4. The hide is then inserted so that the central portion thereof is below the staking mechanism, when a second operation of the pedal will cause the swinging frame to move to its operative position, as shown in solid lines in Figure 4. Draw rollers 32, 32a then draw the hide upwardly about the staking mechanism, thus staking one-half thereof. The hide is then reversed, and the above operations repeated to stake the opposite side thereof.

Since the construction illustrated is obviously capable of further modification without in any manner departing from the spirit of the invention, we do not wish to be understood as limiting ourselves thereto except as hereinafter claimed.

We claim:

1. In a staking machine, a stake, a stretching device comprising a stretching means and a backing-up means therefor comprising a smooth-faced roll, means to draw a hide through said stretching device and about said stake, said stake and stretching bar being each of a length to operate across the full length of a hide, and being disposed to engage a common face of the hide, means to adjust said stake toward and away from said backing-up roll, and means to adjust said stake in a direction transverse to the direction of movement of the hide about said backing-up roll.

2. In a staking machine, a stake, a stretching device comprising a stretching bar and a backing-up means therefor comprising a smooth-faced roll, means to draw a hide through said stretching device and about said stake, said stretching bar comprising a plurality of independently movable spring-pressed sections having angularly disposed blades, the blades being oppositely inclined at opposite sides of the center of the stretching bar, said stake and stretching bar being each of a length to operate across the full length of a hide, and being disposed to engage a common face of the hide, means to adjust said stake toward and away from said backing-up roll, and means to adjust said stake in a direction transverse to the direction of movement of the hide about said backing-up roll.

3. In a staking machine, a stake, a stretching device comprising a stretching bar and a backing-up means therefor comprising a smooth-faced roll, means to draw a hide through said stretching device and about said stake, said stretching bar comprising a plurality of independently movable spring-pressed sections having angularly disposed blades, the blades being oppositely inclined at opposite sides of the center of the stretching bar and the inclination of the blades varying from the center to the ends of the bar, said stake and stretching bar being each of a length to operate across the full length of a hide, and being disposed to engage a common face of the hide, means to adjust said stake toward and away from said backing-up roll, and means to adjust said stake in a direction transverse to the direction of movement of the hide about said backing-up roll.

4. In a staking machine, a stake, a stretching device comprising a stretching bar and a backing-up means therefor comprising a smooth faced roll, means to draw a hide through said stretching device and about said stake, said stretching bar comprising a plurality of independently movable spring-pressed sections having angularly disposed blades, the blades being oppositely inclined at opposite sides of the center of the stretching bar and having their faces shaped to substantially conform to the shaping of the opposed surface of the backing-up roll, said stake and stretching bar being each of a length to operate across the full length of a hide, and being disposed to engage a common face of the hide, means to adjust said stake toward and away from said backing-up roll, and means to adjust said stake in a direction transverse to the direction of movement of the hide about said backing-up roll.

5. In a staking machine, a stake, a stretching device comprising a stretching bar and a backing-up means therefor comprising a smooth faced roll, means to draw a hide through said stretching device and about said stake, said stretching bar comprising a plurality of independently movable spring-pressed sections having angularly disposed blades, the blades being oppositely inclined at opposite sides of the center of the stretching bar and the inclination of the blades varying from the center to the ends of the bar, said blades having their faces shaped to substantially conform to the shaping of the opposed surface of the backing-up roll, said stake and stretching bar being each of a length to operate across the full length of a hide, and being disposed to engage a common face of the hide, means to adjust said stake toward and away from said backing-up roll, and means to adjust said stake in a direction transverse to the direction of movement of the hide about said backing-up roll.

6. In a staking machine, a stake, a stretching device comprising a stretching bar and a backing-up means therefor, means to draw a hide through said stretching device and about said stake, said stretching bar comprising a plurality of independently movable spring-pressed sections having angularly disposed blades, the blades being oppositely inclined at opposite sides of the center of the stretching bar, said backing-up means comprising a bar having blades inclined similarly to and interdigitating with the blades of the stretching bar, said backing-up bar being formed in two sections, and means to relatively adjust said sections in the direction of their length.

7. In a staking machine, a stake, a stretching device comprising a stretching bar and a backing-up means therefor, means to draw a hide through said stretching device and about said stake, said stretching bar comprising a plurality of independently movable spring-pressed sections having angularly disposed blades, the blades being oppositely inclined at opposite sides of the center of the stretching bar and the inclination of the blades varying from the center to the ends of the bar, said backing-up means comprising a bar having blades inclined similarly to and interdigitating with the blades of the stretching bar, said backing-up bar being formed in two sections, and means to relatively adjust said sections in the direction of their length.

8. In a staking machine, a stake, a stretching device comprising a stretching bar and a backing-up means therefor, means to draw a hide through said stretching device and about said stake, said stretching bar comprising a plurality of independently movable spring-pressed sections having angularly disposed blades, the blades being oppositely inclined at opposite sides of the center of the stretching bar and having their faces shaped to substantially conform to the shaping of the opposed surface of the backing-up means, said backing-up means comprising a bar having blades inclined similarly to and interdigitating with the blades of the stretching bar, said backing-up bar being formed in two sections, and means to relatively adjust said sections in the direction of their length.

9. In a staking machine, a stake, a stretching device comprising a stretching bar and a backing-up means therefor, means to draw a hide through said stretching device and about said stake, said stretching bar comprising a plurality of independently movable spring-pressed sections having angularly disposed blades, the blades being oppositely inclined at opposite sides of the center of the stretching bar and the inclination of the blades varying from the center to the ends of the bar, said blades having their faces shaped to substantially conform to the shaping of the opposed surface of the backing-up means, said backing-up means comprising a bar having blades inclined similarly to and interdigitating with the blades of the stretching bar, said backing-up bar being formed in two sections, and means to relatively adjust said sections in the direction of their length.

10. In a staking machine, a stake, a pair of draw rolls for drawing a hide about the stake, and means applying an adjustable regulatable tension on the hide in advance of the stake comprising a backing-up roll associated with the stake, a spreader coacting with the roll and a friction brake operatively associated with the roll.

LAWRENCE ANTHONY LADNER.
WILLIAM G. BOND.